(12) United States Patent
Mawlawi et al.

(10) Patent No.: US 10,158,459 B2
(45) Date of Patent: Dec. 18, 2018

(54) MULTIPLE ACCESS METHOD AND SYSTEM WITH ADAPTIVE FREQUENCY MULTIPLEXING OF DATA SEND AUTHORIZATION REQUESTS

(71) Applicant: Commissariat a L'Energie Atomique et aux Energies Alternatives, Paris (FR)

(72) Inventors: Baher Mawlawi, Grenoble (FR); Jean-Baptiste Dore, Fontanil-Cornillon (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 215 days.

(21) Appl. No.: 15/208,971

(22) Filed: Jul. 13, 2016

(65) Prior Publication Data

US 2017/0019223 A1     Jan. 19, 2017

(30) Foreign Application Priority Data

Jul. 17, 2015   (FR) ...................................... 15 56794

(51) Int. Cl.
*H04L 5/00* (2006.01)
*H04B 7/26* (2006.01)
(Continued)

(52) U.S. Cl.
CPC .......... *H04L 5/0007* (2013.01); *H04B 7/2621* (2013.01); *H04L 5/0037* (2013.01);
(Continued)

(58) Field of Classification Search
CPC combination set(s) only.
See application file for complete search history.

(56) References Cited

U.S. PATENT DOCUMENTS 7,808,908 B1 * 10/2010 Bharghavan .......... H04L 1/0002
  370/229
2009/0092088 A1 * 4/2009 Kokku ................ H04W 52/146
  370/329
(Continued)

FOREIGN PATENT DOCUMENTS

EP   2 822 231 A1   1/2015
EP   2 871 903 A1   5/2015
(Continued)

OTHER PUBLICATIONS

French Preliminary Search Report dated Apr. 25, 2016 in French Application 15 56794, filed Jul. 17, 2015 (with English Translation of Categories of Cited Documents).
(Continued)

*Primary Examiner* — Yee F Lam
(74) *Attorney, Agent, or Firm* — Oblon, McClelland, Maier & Neustadt, L.L.P.

(57) ABSTRACT

A method for multiple access to a frequency band of a communication channel of a communication network with carrier sensing and collision avoidance, including a division of the frequency band into a set of request-to-send sub-bands dedicated to the transmission, by source nodes to a destination node, of request-to-send messages for communicating data on the frequency band is provided. The method includes an evaluation of a communication channel load, and, as a function of the result of the evaluation, a re-division of the frequency band to modify the number of sub-bands of the set of request-to-send sub-bands.

13 Claims, 4 Drawing Sheets

(51) Int. Cl.
H04W 74/08 (2009.01)
H04W 72/04 (2009.01)

(52) U.S. Cl.
CPC ....... *H04L 5/0064* (2013.01); *H04W 72/0486* (2013.01); *H04W 74/0816* (2013.01)

(56) References Cited

U.S. PATENT DOCUMENTS

2015/0009906 A1    1/2015  Dore et al.
2015/0124749 A1*   5/2015  Mawlawi .......... H04W 74/0816
                                                 370/329

FOREIGN PATENT DOCUMENTS

FR    3 008 266 A1    1/2015
FR    3 012 931 A1    5/2015

OTHER PUBLICATIONS

Baher Mawlawi et al. "CSMA/CA with RTS-CTS Overhead Reduction for M2M Communication", 2015 IEEE Wireless Communications and Networking Conference Workshops (WCNCW), Mar. 9, 2015, 6 pages.
U.S. Appl. No. 14/771,394, filed Aug. 28, 2015, 2016/0013961 A1, Jean-Baptiste Dore et al.
U.S. Appl. No. 15/094,200, filed Apr. 8, 2016, Jean-Baptiste Dore.
U.S. Appl. No. 15/204,310, filed Jul. 7, 2016, Pierre Courouve et al.
U.S. Appl. No. 15/204,186, filed Jul. 7, 2016, Pierre Courouve et al.

* cited by examiner

MULTIPLE ACCESS METHOD AND SYSTEM WITH ADAPTIVE FREQUENCY MULTIPLEXING OF DATA SEND AUTHORIZATION REQUESTS

TECHNICAL FIELD

The domain of this invention is that of multiple access to a frequency band of a communication network with carrier sensing and collision avoidance.

THE STATE OF THE PRIOR ART

Carrier Sense Multiple Access/Collision Avoidance (CSMA/CA) is a multiple access protocol that can be used in radio communication systems to manage allocation of the radio resource.

This protocol is used to avoid collisions between multiple users (source nodes) that would like to simultaneously access a common access point (destination node) on the up link.

In one implementation of this protocol, a source node that would like to send data senses the communication channel. If the channel is occupied, a duration (expressed as a number of time slots) of a backoff counter is chosen at random within a [0, CW−1] interval, where CW is a contention window. The backoff counter is decremented by 1 every time that the channel is detected as being available for a duration DIFS ("Distributed Inter-Frame Space"). The backoff counter is stopped when the channel is occupied and it starts again when the channel is once again available for at least the duration DIFS.

When the backoff counter reaches zero, the source node sends a "Request To Send" (RTS) message to the destination node, and waits until it receives a "Clear To Send" (CTS) message from the destination node before sending the data. After reception of all sent data and immediately after expiration of a SIFS ("Short Inter-Frame Space") duration, the destination node sends an ACK ("ACKnowledgment") message.

The contention window CW is an integer within an interval [$CW_{min}$, $CW_{max}$]. This window CW is initially set equal to the minimum value $CW_{min}$. Every time that a source node is involved in a collision, it increases its backoff time by doubling the CW window, up to a maximum value $CW_{max}$. On the other hand, if a transmission is successful, the source node reduces the CW window to its minimum value $CW_{min}$.

A CSMA/CA system in conventional single-channel operation has the advantage that it requires neither signaling for a bandwidth request, nor an allocation according to a planned access. On the other hand, it is not very efficient in that its performances degrade quickly as the number of source nodes increases.

This limitation may be overcome by using a multiple access by distribution to several sub-bands by which several source nodes can send on different sub-bands simultaneously, the source nodes knowing the availability state of each of the sub-bands at every instant. This multiple access by distribution on different sub-bands for example makes use of the OFDMA ("Orthogonal Frequency Division Multiple Access") access method by which the spectral resource (bandwidth) is divided into a set of orthogonal sub-carriers. This set of sub-carriers is itself divided into sub-sets, each sub-set of sub-carriers forming a sub-band. The source nodes thus compete for access to the resource both in time and in frequency.

It has thus been proposed to divide a frequency band of a communication channel into a set of request-to-send sub-bands dedicated to the transmission by the source nodes to a destination node of RTS messages requesting authorization to send data on the frequency band. The destination node senses each of the sub-bands independently and if it detects one or more RTS messages it sends a CTS clear-to-send authorization message to a source node, selected randomly or otherwise from the source nodes that sent the RTS message or messages detected by the destination node. The selected source node sends its data then waits to receive the ACK acknowledgement message. The CTS message, the data and ACK message are sent over the entire communications channel, that is, over the set of sub-bands.

Reference may be made for example to patent application EP 2 822 231 A1 which proposes that each source node should transmit an RTS message over one or more of the request-to-send sub-bands that form a sub-set of said set of request-to-send sub-bands.

Reference may also be made to patent application EP 2871 903 A1 which proposes that each source node should transmit several RTS messages, each on one of the request-to-send sub-bands, so as to increase the probability of an RTS message reaching the destination node and being correctly decoded. In effect, a collision only occurs if each of the RTS messages sent by a source node is involved in a collision on the request-to-send sub-band on which it is transmitted. It is in addition envisaged that the number of RTS messages sent by a source node can be modified dynamically according to the communication channel load, which is reflected in better overall levels of performance.

DESCRIPTION OF THE INVENTION

The purpose of the invention is to provide a technique for improving the transmission capacities of a CSMA/CA system which uses multi request-to-send sub-bands. To this end it discloses a method for multiple access to a frequency band of a communication channel of a communication network with carrier sensing and collision avoidance, wherein the frequency band is divided into a set of request-to-send sub-bands dedicated to the transmission, by source nodes to a destination node, of request-to-send messages for data on the frequency band, the method being characterized in that it comprises the following steps:

the implementation of the multiple access to the frequency band divided into a first number of sub-bands during a first time window, and evaluation of the bitrate of the data sent on the frequency band during the first time window, modification of the division of the frequency band, implementation of the multiple access to the frequency band divided into a second number of sub-bands during a second time window, and evaluation of the bitrate of the data sent on the frequency band during the second time window, comparison of the bitrate of the data sent on the frequency band during the first time window with the bitrate of the data sent on the frequency band during the second time window, modification of the division of the frequency band, consisting of increasing or reducing the number of sub-bands depending on the result of the bitrate comparison.

Some preferred but non-limitative aspects of this method are given below:

if the bitrate during the first time window is greater than the bitrate during the second time window, the modification to the division of the frequency band consists of modifying the number of request-to-send sub-bands from the second number to said first number, and the method furthermore comprises steps consisting of widening the first time window and of implementing the multiple access to the frequency band divided into the first number of request-to-send sub-bands during the first widened time window;

it comprises, at the end of the first widened time window:
an evaluation of the bitrate of the data sent on the frequency band during the first widened time window;
modification of the division of the frequency band, implementation of the multiple access to the frequency band divided into said second number of request-to-send sub-bands during a new second time window, and evaluation of the bitrate of the data sent on the frequency band during the new second time window;
a comparison of the bitrate during the first widened time window with the bitrate during the new second time window.

if the bitrate during the first widened time window is greater than the bitrate during the new second time window, the frequency band is re-divided into said first number of request-to-send sub-bands, and the method furthermore comprises steps consisting of once-again widening the first widened time window and of implementing the multiple access to the frequency band divided into said first number of request-to-send sub-bands during the first time window widened once more;

if the bitrate during the first time window is less than the bitrate during the second time window, the modification to the division of the frequency band consists of modifying the number of request-to-send sub-bands from the second number to a third number, and the method furthermore comprises the implementation of the multiple access to the frequency band divided into said third number of request-to-send sub-bands during a third time window;

it comprises, at the end of the third time window:
an evaluation of the bitrate of the data sent on the frequency band during the third time window;
a comparison of the bitrate during the third time window with the bitrate during the second time window.

if the bitrate during the second time window is greater than the bitrate during the third time window, the frequency band is re-divided into said second number of request-to-send sub-bands, and the method furthermore comprises steps consisting of widening the second time window and of implementing the multiple access to the frequency band divided into said second number of request-to-send sub-bands during the second widened time window.

The invention also relates to a destination node of a communication network with multiple access to a frequency band of a communication channel with carrier sensing and collision avoidance, comprising:
a detection unit configured to detect simultaneous request-to-send authorization messages on the communication channel originating from a plurality of source nodes on a plurality of sub-bands resulting from the division of the frequency band into a set of request-to-send sub-bands;
a transmission unit configured to transmit a clear-to-send data message on the communication channel by at least one source node amongst said plurality of source nodes, said message comprising a field indicating the number of sub-bands in said set of request-to-send sub-bands.

BRIEF DESCRIPTION OF THE ILLUSTRATIONS

Other aspects, purposes, advantages and characteristics of the invention will become clearer after reading the following detailed description of preferred embodiments of this invention, given as non-limitative examples, with reference to the appended drawings on which:

DETAILED DESCRIPTION OF PARTICULAR EMBODIMENTS

In general terms the invention relies on the observation that the number of request-to-send sub-bands dedicated to the transmission of RTS messages by the source nodes plays an important role in overall performance, in particular in terms of bitrate.

This observation is first of all based upon the fact that it is not desirable for the number of request-to-send sub-bands to systematically be a small number. Indeed, in a highly-loaded communications network with, for example, numerous source nodes in competition for access to the uplink, the probability of collision increases and it is preferable to increase the number of request-to-send sub-bands in order to reduce this probability.

On the other hand, neither is it desirable for the number of request-to-send sub-bands to be systematically a large number. Indeed, the division of the frequency band into multiple request-to-send sub-bands increases the time needed to transmit an RTS message to the destination node, which degrades the level of performance.

In this context, the invention proposes to dynamically adapt the number of request-to-send sub-bands according to the communication channel load. In such a way, if the number of collisions increases, the number of request-to-send sub-bands is increased, and on the contrary, if the number of collisions decreases, the number of request-to-send sub-bands is reduced.

Figure 1:
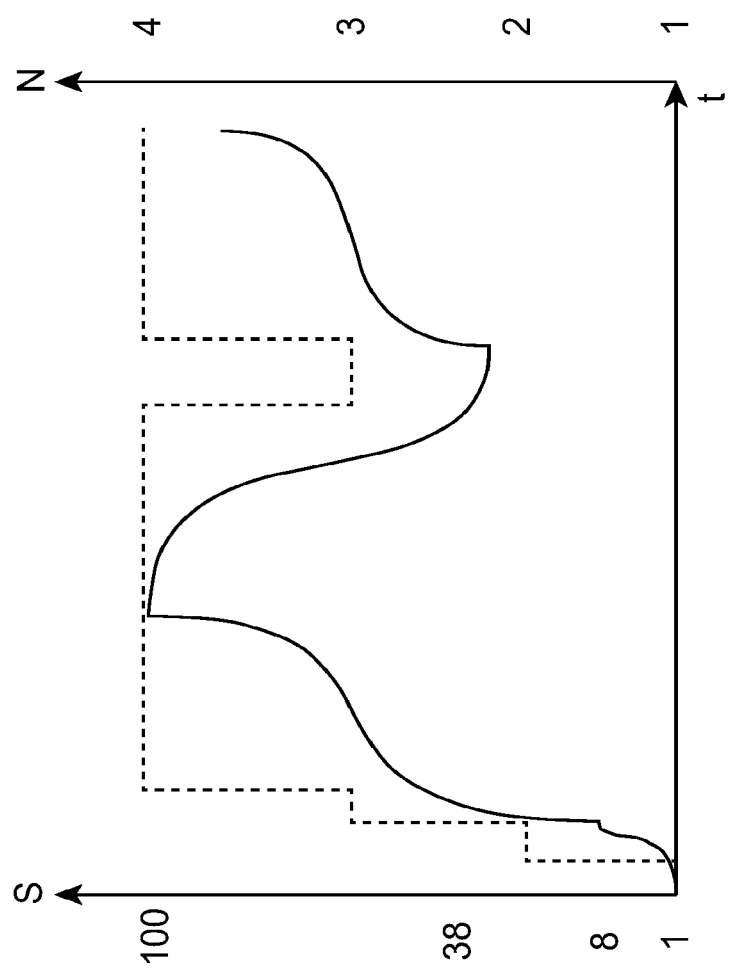
FIG. 1 is a diagram showing the variation in the number of source nodes over time, and the dynamic modification of the number of request-to-send sub-bands proposed by the invention.

FIG. 1 is a diagram showing this principle wherein is shown the variation in the number S of source nodes (in unbroken lines, scale on left) over time t, and the dynamic modification of the number N of request-to-send sub-bands (in broken lines, scale on right) proposed by the invention to take the number S of source nodes into account and adapt to the communication channel load.

A first aspect of the invention applies to a method for multiple access to a frequency band of a communication channel of a communication network, for example a wireless network, with carrier sensing and collision avoidance.

Figure 2:
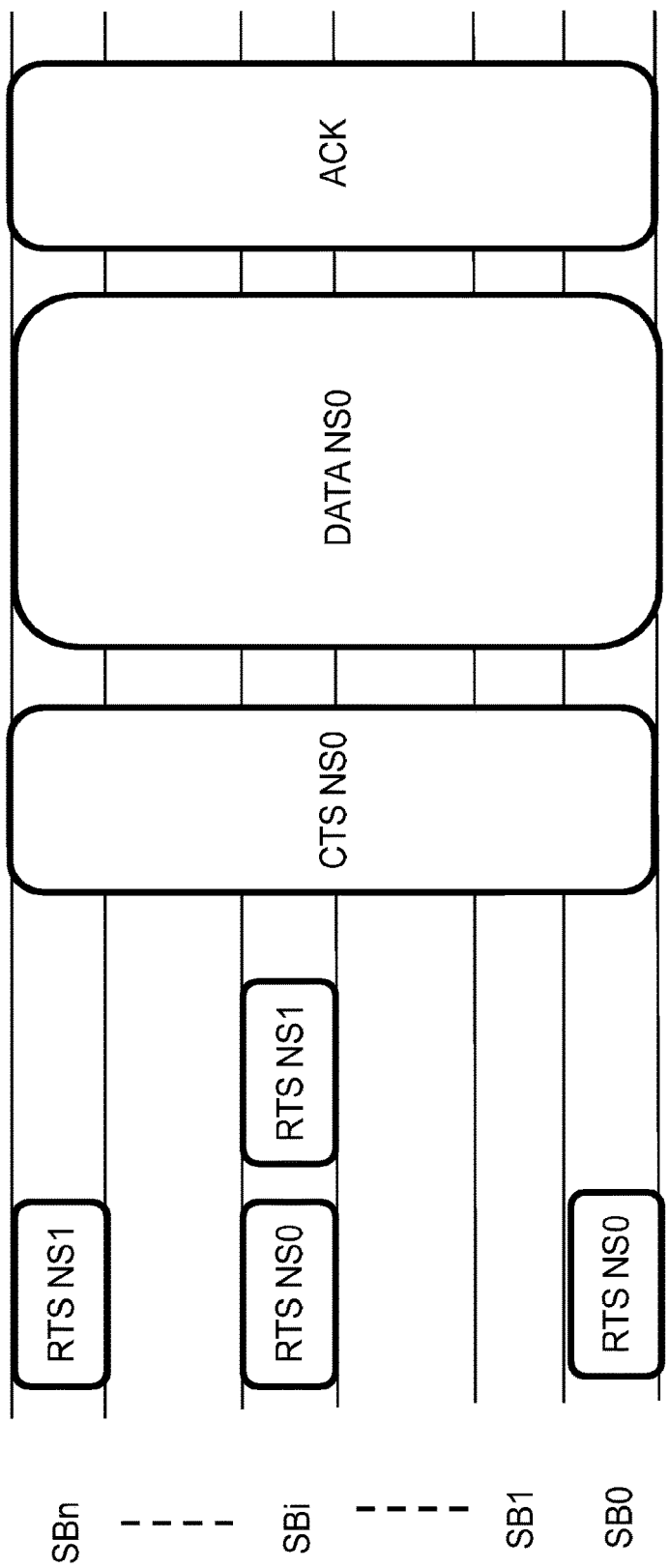
FIG. 2 is a diagram showing the data passing through the various sub-bands in one possible embodiment of the invention.

With reference to FIG. 2, the frequency band is broken down into a set of request-to-send sub-bands SB0, SB1, . . . , SBi, . . . , SBn, said request-to-send sub-bands being dedicated to the transmission by source nodes NS0, NS1 to a destination node of request-to-send authorization messages on the frequency band of the communication channel "RTS NS0", "RTS NS1".

Frequency multiplexing for the transmission of RTS messages is thus allowed, with several source nodes being able to transmit such RTS messages simultaneously on different request-to-send sub-bands. This frequency multiplexing may for example use the OFDMA ("Orthogonal Frequency Division Multiple Access") access method whereby the spectral resource (bandwidth) is divided into a set of orthogonal sub-carriers. This set of sub-carriers is itself divided into sub-sets, each sub-set of sub-carriers forming a sub-band. This frequency multiplexing may also use other multi-carrier modulation types, for example such as an FBMC ("Filter Bank based Multi-Carrier") system.

In the context of this invention, each source node has a backoff counter for which the value is modified (typically decremented by 1) when it is detected that the entire communication channel is available for a given duration (DIFS duration in the context of the CSMA/CA protocol). The communication channel is available when no transmission is made on the set of sub-bands SB0, SB1, . . . , SBi, . . . , SBn of the communication channel.

When the backoff counter of a source node reaches a predetermined value (typically zero), the source node sends its data after the use of a modified RTS/CTS system.

According to this modified RTS/CTS mechanism, the method comprises the transmission by a source node, following the detection of the availability of the communication channel, of one of more request-to-send messages for data on the frequency band, each of said messages being transmitted on one or more request-to-send sub-bands forming a sub-set of said set of request-to-send sub-bands.

This mechanism may be that disclosed in patent application EP 2 822 231 A1, whereby the source node sends a request-to-send message for data on the communication channel (RTS type message) on one or several sub-bands forming a subset of said set of sub-bands of the communication channel (in other words, the message is not sent on all sub-bands).

It may also be the mechanism disclosed in application EP 2 871 903 A1 whereby the source node sends a plurality of request-to-send messages for data on the communication channel, each of said messages being sent on one of the sub-bands of the request-to-send sub-bands. In this context the number of RTS messages sent by a source node is advantageously dynamically modified as a function of the communication channel load.

An example of this second mechanism is shown in FIG. 2. In this example, following the detection of communication channel availability, the source node NS0 sends a plurality (N=2) of "RTS NS0" messages, namely a message on the sub-band SB0 and a message on the sub-band SBi, and source node NS1 also sends a plurality (N=2) of "RTS NS1" messages, namely a message on sub-band SB1 and a message on sub-band SBn.

This number N of RTS type messages that a source node can send on one of the request-to-send sub-bands can advantageously be modified in time. Consequently, the invention covers not only cases in which one source node always sends several RTS type messages for which the quantity may be modified, but also the case in which under some conditions the source node only sends one RTS type message, and where under other conditions the source node sends a plurality of RTS type messages.

In this second mechanism, the request-to-send messages for data on the communication channel sent by a source node can only be received incorrectly by the destination node if all the corresponding N messages collided with other messages.

FIG. 2 shows, in this respect, an example collision in a sub-band that does not affect correct reception by the destination node of a request-to-send message for data on the communication channel, sent by a source node. In this example the "RTS NS0" and "RTS NS1" messages collide on the sub-band SBi. However, due to the diversity available due to transmission of several RTS type messages on several sub-bands, no collision occurs on sub-band Sbn, and no collision occurs on the sub-band SB0. Therefore the "RTS NS0" and "RTS NS1" messages sent on sub-band SB0 and on sub-band SBn respectively are received correctly by the destination node.

In one embodiment, sub-bands for transmission of RTS messages by a source node are imposed, for example through a list of sub-bands that the source node may know.

In another embodiment, the source node selects the sub-band(s) for transmission of the RTS message(s). The selection may use a distribution probability law on each sub-band or on each sub-band of a sub-set of the set of sub-bands imposed at the source node. The probability law may be a random law for example. It may however take a more elaborate form.

In one embodiment, the number of RTS messages sent by a source node is a function of a priority level associated with the source node. Thus a source node of higher priority than another source node then transmits more RTS messages than said other node. It will be understood that the high priority source node then has a higher chance of correct reception of at least one of its RTS type messages and consequently more probable access to the communication channel.

The destination node comprises a detection unit configured to detect RTS messages sent simultaneously by a plurality of source nodes on a plurality of request-to-send sub-bands and which have not undergone collision (in FIG. 2, there are shown simultaneous messages "RTS NS0" and "RTS NS1" sent respectively on sub-bands SB0 and SBn).

The destination node furthermore comprises a transmission unit configured to transmit a clear-to-send CTS type message on the communication channel through at least one source node among said plurality of source nodes "CTS NS0". The source node(s) authorized to send on the communication channel then send their data "DATA NS0" on the communication channel, in other words on all sub-bands in the communication channel. The destination node sends an acknowledgement message ACK once the data transmission is complete, if it is successful.

The CTS clear to send type message for data on the communication channel through at least one source node among said plurality of source nodes "CTS NS0" is also sent on the communication channel, on all sub-bands.

According to the invention, the detection unit of the destination node is configured to sense each sub-band and detect simultaneous request-to-send messages for data that originate from a plurality of source nodes. Simultaneous messages refers to messages sent by source nodes in a single time slot when the source nodes and the destination node are synchronized, or messages sent by source nodes in a single time window beginning with the availability of the communication channel and taking account of the duration necessary to maintain availability before transmission (DIFS type) and the propagation time for the different source nodes.

With reference to FIG. 2, the destination node may thus detect two simultaneous "RTS NS0", "RTS NS1" request-to-send messages for data on the communication channel originating from two source nodes NS0, NS1, and which are not in collision. In the context of a conventional CSMA/CA protocol, the two messages would have been sent simultaneously on the communication channel in which they would have collided, such that neither of the two source nodes could have sent. In the context of the invention, the risk of collision is very much reduced because each of the messages is sent on a request-to-send sub-band. And this risk is obviously much lower when there is a large number of sub-bands. Since the probability of collision of simultaneous RTS messages is lower, the global performance of the system is improved.

In one embodiment, the destination node makes a random selection of one or several source nodes among the plurality of source nodes that simultaneously sent a request-to-send message for data on the communication channel.

In another embodiment, the destination node makes a selection, based on a priority level associated with each source node, of one or several source nodes among the plurality of source nodes that simultaneously sent a request-to-send message for data on the communication channel (for example by selecting higher priority source node(s) so as to guarantee them a certain level of service quality).

With reference to FIG. 2, a single source node NS0 is selected (at random or due to its priority level) and the selected source node sends a clear-to-send message "CTS NS0" for data on the entire communication channel. After reception of the clear-to-send message "CTS NS0" for data, the selected source node NS0 sends its data "DATA NS0" on the entire communication channel and then waits for an acknowledgement message "ACK" sent by the destination node also on the entire communication channel.

A second embodiment of the invention allows for sending data from a set of source nodes, possibly including up to m source nodes. In this case, the destination node can organize up to m source nodes which will be capable of sending their data without having to re-attempt to send the transmission with one or more new RTS messages. If the number n of RTS messages correctly decoded at the destination node is less than the number m, then the n source nodes are selected. On the other hand, if the number n of simultaneous RTS messages is more than m, the destination node then selects m source nodes from among n, either at random or depending on their priority level.

The destination node sends a clear-to-send message for data on the communication channel sent by a set of source nodes (where when n≤m said set includes all the nodes in said plurality of source nodes, and where when n>m, said set includes only some of them) including a field indicating, for each source node in said set, an immediate or delayed transmission on the communications channel after sensing one or several acknowledgement messages sent by the destination node on the communication channel.

As an example, two source nodes NS0 and NS1 can be selected, and the clear-to-send message for data on the communication channel by the selected source nodes "CTS NS0&NS1" includes a field indicating an immediate transmission from the first source node NS0 and a delayed transmission from the second source node NS1 after sensing of an acknowledgement message ACK for data sent by the destination node. Thus, after reception of the "CTS NS0&NS1" clear-to-send message for data, the source node NS0 sends its data "DATA NS0" on the entire communication channel and then waits for an acknowledgement message "ACK" sent by the destination node, for example on the entire communication channel. After sensing the acknowledgement message, the source node NS1 sends its data "NS1 DATA" and then waits for an acknowledgement message "ACK".

The method according to the invention is characterized in that the division of the frequency band into a plurality of request-to-send sub-bands is not fixed, but is on the contrary dynamically modified as a function of the communication channel load.

Thus the number of request-to-send sub-bands changes over time, increasing when the load is high in order to reduce the probability of collision, and on the other hand decreasing when the load is low so as not to unnecessarily slow down the transmission of RTS messages.

The invention extends generally to multiple modifications of the number of request-to-send sub-bands, with at least one application of a multi-sub-band strategy (number of sub-bands equal to at least 2) without excluding implementation of a strategy in which the number of sub-bands is equal to 1.

The method according to the invention thus comprises the evaluation of a communication channel's load and as a function of the result of said evaluation, a new division of the frequency band to modify the number of sub-bands of said set of request-to-send sub-bands.

The evaluation of the communication channel load, and the decision to repeat the division of the frequency band to modify the number of request-to-send sub-bands are, more precisely achieved by means of a learning algorithm which uses a bitrate estimation estimated by the destination node as a representative metric for the communication channel load.

The bitrate may be estimated by the destination node as being the ratio between the period elapsed in data reception mode (which corresponds to the reception of the "DATA NS0" message in the example in FIG. 2) and a time interval considered for the multiple access to the frequency band.

To begin with, a number of request-to-send sub-bands is set at a first number and multiple access is achieved with this number of request to send sub-bands during a first time window. At the end of the first time window, the bitrate during the first time window is calculated, and the frequency band is once more divided to modify the number of request-to-send sub-bands from the first number to a second number. Multiple access to the frequency band is then implemented with said second number of request-to-send sub-bands during a second time window, which is preferably of a duration which is at most equal to that of the first time window.

At the end of the second time window, the destination node determines the bitrate during the second time window, and the number of sub-bands is modified or not, depending on the result of a comparison between the bitrate during the first time window and the bitrate during the second time window. The exact number of request-to-send sub-bands for multiple access following the end of the second time window is transmitted to the source nodes by means of the CTS message.

An example of the decision for modification of the number of request-to-send sub-bands is as follows.

If the bitrate during the first time window is greater than the bitrate during the second time window, the frequency band is divided once again to modify the number of request-to-send sub-bands from the second number to said first number, the first time window is widened and multiple access to the frequency band is implemented with said first number of bands during the first widened time window. In other words, the first division is re-adopted, since it ensures a better bitrate, for a longer time interval (the first time window has been widened) which in particular offers a more reliable estimate of the bitrate.

If on the other hand the bitrate during the first time window is less than the bitrate during the second time window, the frequency band is divided once again to modify the number of request-to-send sub-bands from the second number to a third number, and multiple access to the frequency band is implemented with said third number of bands during a third time window. In other words, a new modification of the number of sub-bands is undertaken, since the second division break-down offers a better bitrate than the first break-down, and the best break-down is sought.

These steps are then reiterated at the end of the third time window, by comparing the bitrate obtained with the third number of sub-bands with that obtained with the second number of sub-bands. If it is worse, the second number is re-adopted on a second widened time window. If it is better, the number of sub-bands is modified to a fourth number to implement multiple access during a fourth time window. It will be noted that by making provision for second, third and fourth time windows of duration at most equal to that of the first time window (before widening), the method is reactive to possible changes in the communication channel load.

Figure 3:
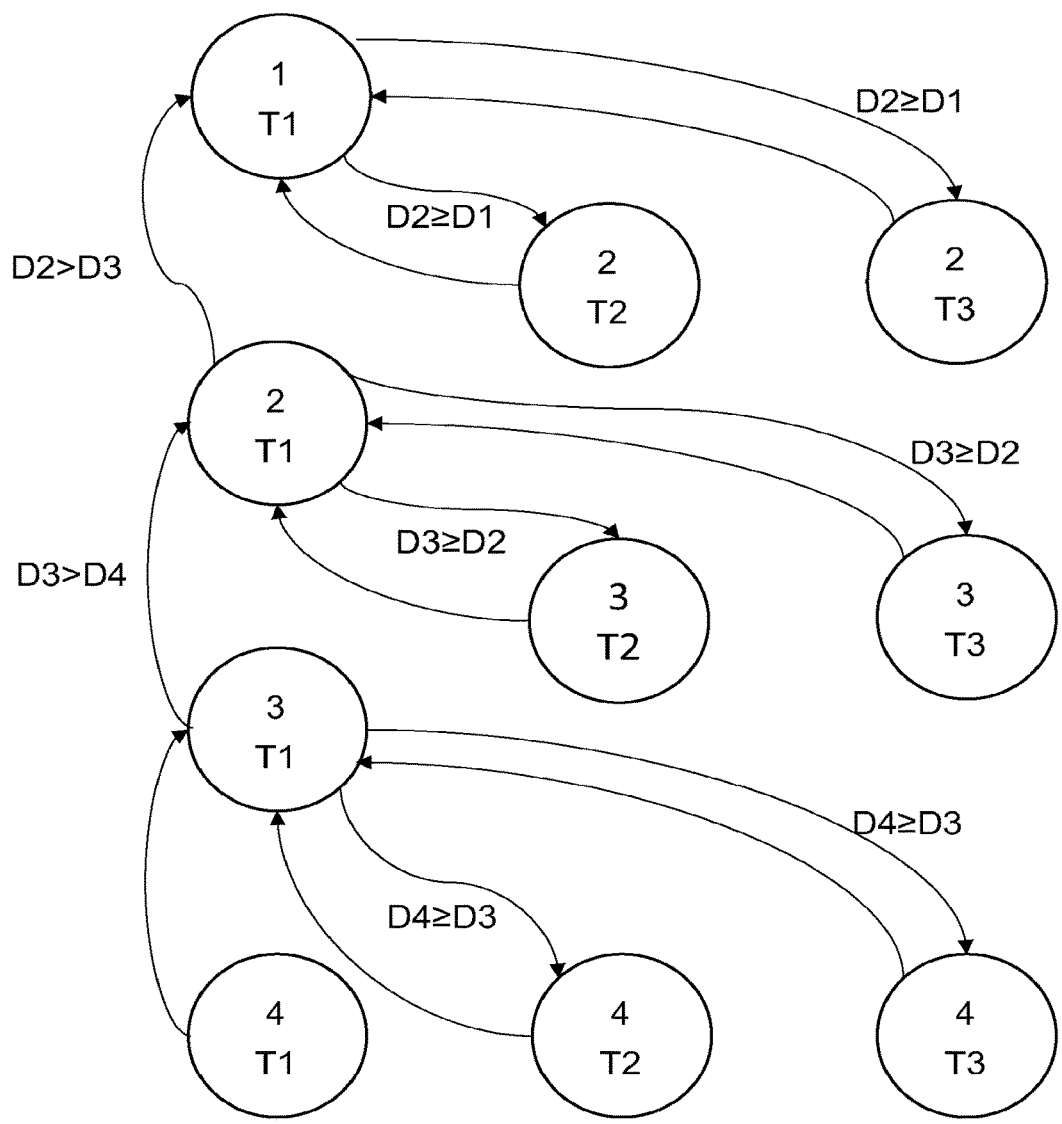
FIGS. 3 and 4 are diagrams of state machines representative of algorithms which may be implemented in the context of the invention in order to undertake modification of the number of request-to-send sub-bands.
Figure 4:
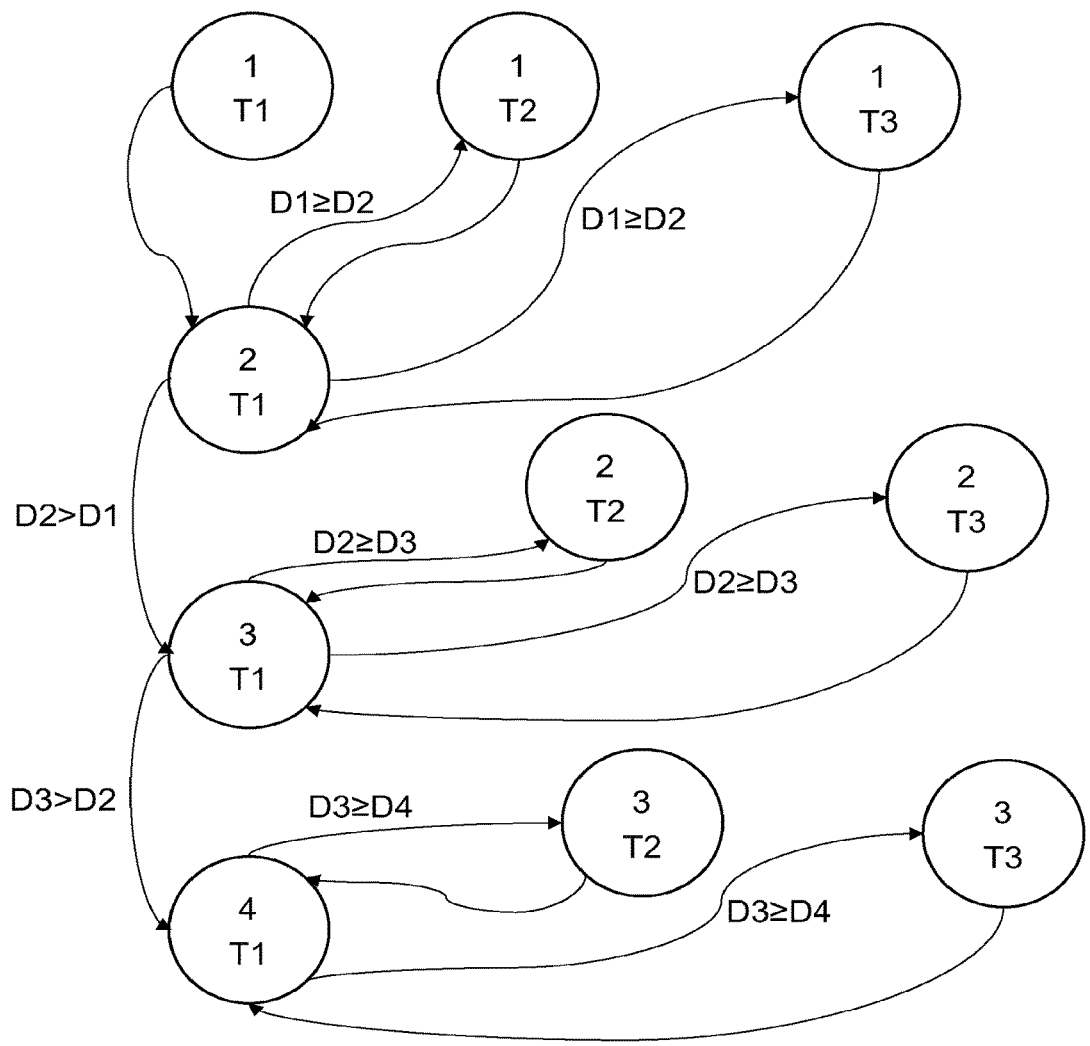

This algorithm is illustrated by the state machines represented in FIGS. 3 and 4. In FIG. 3, the initial number of sub-bands is set at a maximum number (3 in the example) and the modification of the number of sub-bands from the first number to the second number and from the second number to the third number consists of reducing the number of sub-bands (decrement of one in the example). In FIG. 4, the initial number of sub-bands is set at a minimum number (1 in the example) and the modification of the number of sub-bands from the first number to the second number and from the second number to the third number consists of increasing the number of sub-bands (increment of one in the example). In each of these figures two widenings of the time window are possible in order to adopt one from amongst three possible durations T1, T2, and T3, where T3>T2>T1. The invention is not however limited to this number of three, but extends to any number n whatsoever of possible time intervals. In each of these figures a circle represents the implementation of a multiple access using a division into a number of sub-bands indicated by the number at the top of the circle over a time interval represented by T1, T2 or T3 at the bottom of the circle. Finally, in these figures, the start and end points correspond to the maximum and minimum numbers of sub-bands. The invention however is not limited to such a case in point, since the start and end points can correspond to any value whatsoever between a maximum number and a minimum number of sub-bands.

With reference to FIG. 3, the method begins with a break-down into four bands used during a first time window of duration T1. At the end of T1, the bitrate D4 is estimated. Then a division into three bands is used during a second time window of duration T1 and the bitrate D3 then obtained is estimated.

If the bitrate D4 is better than bitrate D3, a re-division into four bands is carried out that is used during a first time window of widened duration T2 in order to observe a new bitrate D4. At the end of this widened period T2, during a second time window of duration T1 a break-down into three bands is used and the bitrate D3 evaluated once more. If the bitrate D4 remains better than bitrate D3, a re-division into four bands is carried out that are used during a first time window, widened once again, of duration T3 etc.

If the bitrate D4 is worse than bitrate D3, a re-division into two bands is carried out that is used during a third time window of duration T1 etc. The bitrate D2 is evaluated. If D3 is better than D2, a return to the use of a break-down into three bands is used, this time over a second widened time window of duration T2. If D2 is better than D1, multiple access is used with a single band during a fourth time window of duration T1, and D1 and D2 must then be compared to decide whether or not to use a break-down into two bands.

With reference to FIG. 4, the method begins with a break-down into one band used during a first time window of duration T1. At the end of T1, the bitrate D1 is estimated. Then a break-down into two bands is used during a second time window of duration T1 and the bitrate D2 then obtained is evaluated.

If the bitrate D1 is better than bitrate D2, a re-division into one band is carried out that is used during a first widened time window of duration T2 in order to observe a new bitrate D1. At the end of this widened period, during a second time window T1 a division into two bands is used and the bitrate D2 is evaluated once more. If the bitrate D1 remains better than bitrate D2, a re-division into one band is carried out that is used during a first time window, widened once again, of duration T3 etc.

If the bitrate D1 is worse than bitrate D2, a re-division into three bands is carried out that are used during a third time window T1. The bitrate D3 is evaluated. If D2 is better than D3, a return to the use of a division into two bands occurs, this time over a second widened time window of duration T2. If D3 is better than D2, multiple access is used with four bands during a fourth time window of duration T1 and D3 and D4 must then be compared to decide whether or not to use a division into three bands.

The state machines in FIGS. 3 and 4 may be implemented together, with that in FIG. 4 being implemented once that of FIG. 3 has led to consider the minimum number of sub-bands and that of FIG. 3 being implemented once that of FIG. 4 has led to consider the maximum number of sub-bands.

The invention is not limited to the method as described above, but it also relates to a destination node in a communication network with multiple access to a frequency band of a communication channel with carrier sensing and collision avoidance, which includes:
  a detection unit configured to detect simultaneous request-to-send messages originating from a plurality of source nodes on a plurality of sub-bands resulting from the division of the frequency band into a set of request-to-send sub-bands;
  a transmission unit configured to transmit a clear-to-send message by at least one source node amongst said plurality of source nodes, said message comprising a field indicating the number of sub-bands in said set of request-to-send sub-bands.

The clear-to-send CTS message can thus inform each source node of the number of request-to-send sub-bands for the transmission of RTS type messages, where this information may be supplemented by information relating to the selection of sub-bands (type of distribution probability law, limitation to a group of sub-bands, etc.) and to the number of RTS messages to send.

The destination node may furthermore comprise an evaluation unit configured to estimate a communication channel load, and a division unit configured for determining the number of request-to-send sub-bands which is to result from a division of the frequency band as a function of the load estimated by the evaluation unit.

The invention also relates to a communication network with multiple access a frequency band of a communication channel with carrier sensing and collision avoidance, including source nodes and a destination node according to the invention.

The invention claimed is:

1. A method for multiple access to a frequency band of a communication channel in a communication network with carrier sensing and collision avoidance, wherein the frequency band is divided into a set of request-to-send sub-bands dedicated to a transmission, by source nodes to a destination node, of request-to-send messages for communicating data on the frequency band, the method comprising:
   implementing the multiple access to the frequency band divided into a first number of request-to-send sub-bands during a first time window, and evaluating a bitrate of the data sent on the frequency band during the first time window,
   modifying the division of the frequency band, implementing the multiple access to the frequency band divided into a second number of request-to-send sub-bands during a second time window, and evaluating a bitrate of the data sent on the frequency band during the second time window,
   comparing the bitrate of the data sent on the frequency band during the first time window with the bitrate of the data sent on the frequency band during the second time window,
   modifying the division of the frequency band, by increasing or reducing the second number of request-to-send sub-bands depending on the result of the comparing of the bitrates, wherein said modifying consists in modifying the number of request-to-send sub-bands from the second number to the first number when the bitrate during the first time window is greater than the bitrate during the second time window, and
   further comprising, when the bitrate during the first time window is greater than the bitrate during the second time window, widening the first time window and implementing the multiple access to the frequency band divided into said first number of request-to-send sub-bands during the first widened time window.

2. The method according to claim 1, comprising, at the end of the first widened time window:
   evaluating the bitrate of the data sent on the frequency band during the first widened time window;
   modifying the division of the frequency band, implementing the multiple access to the frequency band divided into said second number of request-to-send sub-bands during a new second time window, and evaluating the bitrate of the data sent on the frequency band during the new second time window;
   comparing the bitrate during the first widened time window with the bitrate during the new second time window.

3. The method according to claim 2 wherein if the bitrate during the first widened time window is greater than the bitrate during the new second time window, the frequency band is re-divided into said first number of request-to-send sub-bands, and furthermore comprising once again widening the first widened time window and of implementing the multiple access to the frequency band divided into said first number of request-to-send sub-bands during the first time window widened once more.

4. The method according to claim 1, wherein if the bitrate during the first time window is less than the bitrate during the second time window, modifying the division of the frequency band consists of modifying the number of request-to-send sub-bands from the second number to a third number, and furthermore comprising implementing the multiple access to the frequency band divided into said third number of request-to-send sub-bands during a third time window.

5. The method according to claim 4, comprising, at the end of the third time window:
   evaluating the bitrate of the data sent on the frequency band during the third time window;
   comparing the bitrate during the third time window with the bitrate during the second time window.

6. The method according to claim 5, wherein if the bitrate during the second time window is greater than the bitrate during the third time window, the frequency band is re-divided into said second number of request-to-send sub-bands, the method furthermore comprising widening the second time window and of implementing the multiple access to the frequency band divided into said second number of request-to-send sub-bands during the second widened time window.

7. The method according to claim 1, comprising at a source node:
   detecting availability of the communication channel;
   following detecting availability of the communication channel, modifying a backoff counter value; and
   when the backoff counter value reaches a predetermined value, transmitting to the destination node one of more request-to-send messages for communicating data on the frequency band, each of said messages being transmitted on one or more request-to-send sub-bands forming a sub-set of said set of request-to-send sub-bands.

8. The method according to claim 7, comprising transmitting, to the destination node by the source node, of several request-to-send messages, each said message being sent on a request-to-send sub-band.

9. The method according to claim 8, further comprising, depending on the result of the comparison, modifying a number of request-to-send messages sent by the source node following detecting the availability of the communication channel.

10. The method according to claim 1, comprising at the destination node:
    detecting simultaneous request-to-send messages on the frequency channel sent by a plurality of source nodes on a plurality of request-to-send sub-bands,
    trasmitting a clear-to-send message for communicating data on the frequency band by at least one source node amongst said plurality of source nodes, said clear-to-send message comprising a field indicating a number of sub-bands resulting from the division of the frequency band.

11. The method according to claim 1, wherein a bitrate of the data sent on the frequency band during a respective time window for implementing the multiple access to the frequency band is evaluated as being the ratio of a time interval spent in data reception mode and a duration of the time window.

12. A destination node in a communication network with multiple access to a frequency band of a communication channel with carrier sensing and collision avoidance, comprising:
    circuitry configured to detect simultaneous request-to-send messages for communicating data on the communication channel originating from a plurality of source nodes on a plurality of sub-bands resulting from a division of the frequency band into a set of request-to-send sub-bands;

estimate a bitrate of the data sent on the frequency band during a first time window for implementing the multiple access to the frequency band in which the frequency band is divided into a first number of request-to-send sub-bands and during a second time window for implementing the multiple access to the frequency band in which the frequency band is divided into a second number of request-to-send sub-bands, compare the bitrate of the data sent on the frequency band during the first time window with the bitrate of the data sent on the frequency band during the second time window and to increase or reduce the second number of request-to-send sub-bands depending on the result of the comparing of the bitrates, the number of request-to-send sub-bands being modified from the second number to said first number when the bitrate during the first time window is greater than the bitrate during the second time window, transmit a clear-to-send message for communicating data on the communication channel by at least one source node amongst said plurality of source nodes, said clear-to-send message comprising a field indicating an increased or decreased number of sub-bands, and when the bitrate during the first time window is greater than the bitrate during the second time window, to estimate the bitrate of the data sent on the frequency band divided into the first number of request-to-send sub-bands during a time window corresponding to a widening of the first time window.

13. The destination node according to claim 12, wherein the bitrate of the data sent on the frequency band during a respective time window is evaluated by the circuitry as being the ratio of a time interval spent in data reception mode and a duration of the time window.

* * * * *